(12) United States Patent
Miralles et al.

(10) Patent No.: US 12,065,986 B2
(45) Date of Patent: Aug. 20, 2024

(54) SYSTEM FOR CONTROLLING AN AIRCRAFT THRUST REVERSAL MEANS

(71) Applicants: SAFRAN NACELLES, Gonfreville-l'Orcher (FR); SAFRAN LANDING SYSTEMS, Velizy-Villacoublay (FR); SAFRAN ELECTRONICS & DEFENSE, Paris (FR); SAFRAN AIRCRAFT ENGINES, Paris (FR)

(72) Inventors: Laurent Miralles, Moissy-Cramayel (FR); Hakim Maalioune, Moissy-Cramayel (FR); Christophe Bastide, Moissy-Cramayel (FR); Jérémy Edmond Fert, Moissy-Cramayel (FR); Vincent Hupin, Moissy-Cramayel (FR)

(73) Assignees: SAFRAN NACELLES, Gonfreville-l'Orcher (FR); SAFRAN LANDING SYSTEMS, Velizy-Villacou-Blay (FR); SAFRAN ELECTRONICS & DEFENSE, Paris (FR); SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/790,048

(22) PCT Filed: Dec. 23, 2020

(86) PCT No.: PCT/FR2020/052622
§ 371 (c)(1),
(2) Date: Jun. 29, 2022

(87) PCT Pub. No.: WO2021/136911
PCT Pub. Date: Jul. 8, 2021

(65) Prior Publication Data
US 2022/0412287 A1    Dec. 29, 2022

(30) Foreign Application Priority Data

Dec. 30, 2019 (FR) .................................. 1915732

(51) Int. Cl.
*B64D 45/00* (2006.01)
*B64C 25/42* (2006.01)
(Continued)

(52) U.S. Cl.
CPC .............. *F02K 1/32* (2013.01); *B64C 25/426* (2013.01); *B64D 45/00* (2013.01); *G05D 1/101* (2013.01)

(58) Field of Classification Search
CPC ......... F02K 1/32; B64C 25/426; B64D 45/00; G05D 1/101
See application file for complete search history.

(56) References Cited

U.S. PATENT DOCUMENTS

2019/0127076 A1 *  5/2019  Hodges .................. B64D 31/10

FOREIGN PATENT DOCUMENTS

FR          2930973 A1    11/2009
FR          3045563 A1     6/2017

OTHER PUBLICATIONS

International Search Report mailed May 6, 2021, issued in corresponding International Application No. PCT/FR2020/052622, filed Dec. 23, 2020, 5 pages.
(Continued)

*Primary Examiner* — Tye William Abell
(74) *Attorney, Agent, or Firm* — CHRISTENSEN O'CONNOR JOHNSON KINDNESS PLLC (57) ABSTRACT

This system (36) for controlling an aircraft thrust reversal means comprises a reverse idle control means (38), a first detection means (31) configured to detect, when the reverse idle control is active, a condition for activation of the thrust (Continued)

reversal means, and an actuation means (52) configured to activate the thrust reversal means when the first detection means (31) detects a condition for activation of the thrust reversal means.

It further comprises a second detection means (42, 44, 46, 48, 49) configured to detect a condition for activation of the reverse idle control, the control means (38) being configured to activate the reverse idle control when the second detection means (42, 44, 46, 48, 49) detects a condition for activating the reverse idle control.

17 Claims, 5 Drawing Sheets

(51) Int. Cl.
      *F02K 1/32*       (2006.01)
      *G05D 1/00*       (2006.01)

(56)       References Cited

OTHER PUBLICATIONS

Written Opinion mailed May 6, 2021, issued in corresponding International Application No. PCT/FR2020/052622, filed Dec. 23, 2020, 5 pages.

\* cited by examiner

SYSTEM FOR CONTROLLING AN AIRCRAFT THRUST REVERSAL MEANS

CROSS-REFERENCES TO RELATED APPLICATIONS

This application is a National Stage of International Application No. PCT/FR2020/052622 filed Dec. 23, 2020, which claims priority to French Patent Application No. 3105804, filed Dec. 30, 2019, the entire disclosures of which are hereby incorporated by reference.

FIELD

The present invention relates to a system and a method for controlling an aircraft thrust reversal means.

BACKGROUND

During a landing, an aircraft, for example an airplane, lands on a surface, for example an airstrip, at a high speed. Then, braking systems act to reduce the speed of the aircraft until it comes to a complete stop or allows it to run safely to a parking point.

The braking systems implemented to reduce the speed of the aircraft during a landing comprise friction brakes acting on the landing gear, ground spoilers, and thrust reversers. In a typical landing procedure, once the pilot has landed the aircraft on the runway, he immediately actuates the friction brakes and the ground spoilers. If he deems it necessary, the pilot can manually actuate the thrust reversers. The actuation of the thrust reversers can also take place during an aborted take-off of the aircraft.

If the braking systems are not used optimally, the aircraft risks performing a longitudinal runway excursion. This can result in dramatic consequences for the passengers of the aircraft or for people located close to the runway. This risk is even greater when the length of the runway is short, when the aircraft is heavy or when the weather conditions are unfavourable.

To limit this risk, an auto brake system, also known by the corresponding acronym "AB" has been proposed. Such a system automatically actuates the friction brakes as soon as the aircraft lands on the runway. Such a solution therefore allows to reduce the reaction time before the actuation of the friction brakes, and therefore to reduce the braking distance.

However, such a solution may not provide satisfaction under certain conditions. For example, when the airstrip is wet, the friction brake does not work to its full efficiency. It may also happen that, due to excessive time between the start of the flare and the aircraft touching down on the runway, the friction brakes alone are not sufficient to stop the aircraft in time. In the event of an aborted take-off, the remaining runway length may be critical to allow the aircraft to stop without performing a runway excursion. In these examples, the aircraft risks a longitudinal runway excursion unless reverse thrust is used.

SUMMARY

For this purpose, the pilot must make the decision to use the reverse thrust and manually actuate the opening of the thrust reversers. These actions must be implemented in a stressful situation for the pilot, due to bad weather conditions, the late touchdown of the aircraft on the runway, or an aborted take-off. Due to this stress, the pilot may take some time to make the decision to use the reverse thrust or even forget to actuate the opening of the thrust reversers.

Figure 1:
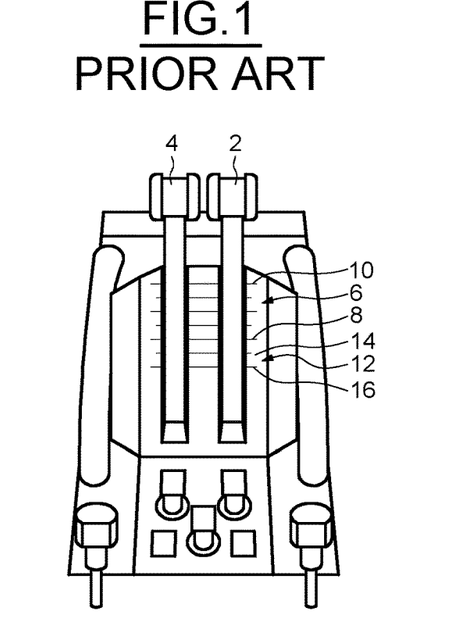
FIG. 1 is a control lever for the thrust of an aircraft.
Figure 2:
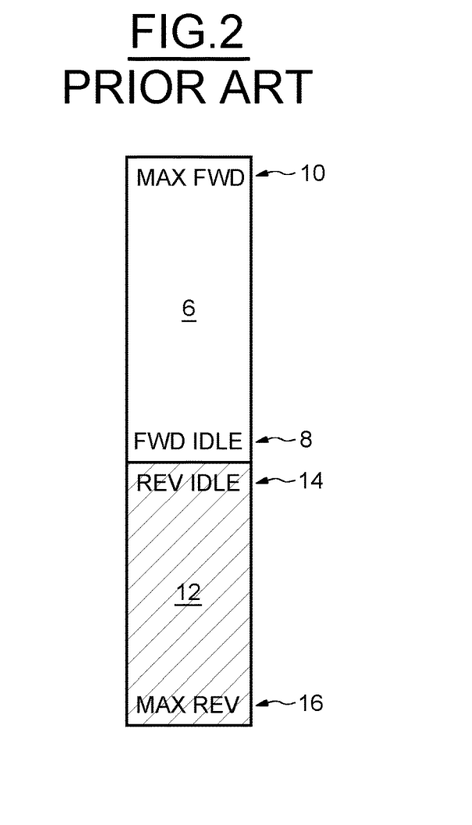

To overcome this disadvantage, some aircraft are equipped with a reverse idle control, also known by the corresponding abbreviation "REV IDLE". With reference to FIGS. 1 and 2, a control lever 2 or 4 for the thrust of such an aircraft can be positioned in a forward operating range 6, located between a forward idle position, also known by the corresponding abbreviation "FWD IDLE", and a forward full throttle position 10, also known by the name "Forward Maximum" or by the corresponding abbreviation "FWD MAX". The control lever 2 or 4 can also be positioned in a thrust reversal range 12 generally identified by grooves. The range 12 extends between a reverse idle position 14, also known by the corresponding abbreviation "REV IDLE", and a maximum power position with reverser 16, also known as "Reverse Maximum" or under the corresponding abbreviation "REV MAX".

In an aircraft provided with such a reverse idle control, the pilot places the control lever 2 or 4 in the position 14 at a moment before the aircraft touches the runway. For example, the pilot can place the control lever 2 or 4 in position 14 at the start of the flare in the final landing phase, at the same moment as the moment when he completely reduces the throttle. In response, the thrust reverser remains closed until it is detected that the weight of the aircraft is resting on the landing gear. As soon as the weight of the aircraft rests on the landing gear, the thrust reverser is opened and the reverse thrust can be implemented with reduced response time.

While such a solution may have reduced the risk of longitudinal runway excursion in the case of landing, it is not entirely satisfactory. Indeed, this solution requires that the pilot undertakes to position the lever 2 or 4 in position 14 during a final phase of the landing of the aircraft. At this moment, the pilot is already under significant stress. This stress is even greater when the weather conditions are bad, which corresponds to the conditions wherein the thrust reversers are likely to have to play an important role. As a result, the risk is always present that the pilot actuates too late, or forgets to actuate the thrust reversers.

In view of the foregoing, the invention aims at overcoming the aforementioned disadvantages.

More particularly, the invention aims at improving the control of the reverse thrust in order to reduce as much as possible the time elapsed before the implementation of the reverse thrust or to limit the risk of forgetting the actuation of the thrust reversers.

To this end, provision is made of a system for controlling an aircraft thrust reversal means, comprising a reverse idle control means, a first detection means configured to detect, when the reverse idle control is active, a condition for activation of the thrust reversal means, and an actuation means configured to activate the thrust reversal means when the first detection means detects a condition for activation of the thrust reversal means.

According to one of its general features, this system further comprises a second detection means configured to detect a condition for activation of the reverse idle control, the control means being configured to activate the reverse idle control when the second detection means detects a condition for activating the reverse idle control.

This prevents a user, for example a pilot of the aircraft, from having to control the control means during a stressful phase such as a final landing phase or a phase of triggering an aborted take-off. This results in a faster reaction time before the implementation of the reverse thrust and a reduction in the risk that the control to actuate the reverse thrust is forgotten.

It is further possible to provide an arming module able to be activated by a user during a step of preparing the landing of the aircraft and/or a step of preparing the take-off of the aircraft, the second detection means being configured to detect a condition for activation of the reverse idle control only if the arming module is activated.

This prevents a triggering of the reverse thrust from occurring in an undesired manner, in particular during a cruise flight phase.

Advantageously, the arming module comprises means for arming an auto brake system of the aircraft, the arming module being configured to be activated when a user actuates the arming means.

Such an arming module simplifies handling the control system by allowing a user, for example a pilot of the aircraft, to arm the control system of the thrust reversal means at the same time as he arms the aircraft auto brake system.

In one embodiment, the control means comprises a controller and a control lever for at least one engine of the aircraft, the control lever being capable of activating a reverse idle control.

It is further possible to provide a motorised actuator in communication of information with the controller, the controller being able to control the motorised actuator so as to change a position of the control lever between a position wherein the control lever controls a forward operation of the engine of the aircraft and a position wherein the control lever activates a reverse idle control.

Such a design allows to easily automate the thrust reversal control while ensuring good visual control of the activation of this control by a user, for example a pilot of the aircraft.

It is also possible to provide a means for displaying the position of the control lever.

According to another embodiment, the system comprises a means for displaying the activation of the reverse idle control, the controller being capable of directly activating the reverse idle control.

Such a design allows to automate the thrust reversal control without requiring controlling an actuator to change the position of a control lever of the engine(s) of the aircraft, or having such an actuator.

In one embodiment, the second detection means is capable of detecting at least one parameter selected from a speed of the aircraft, an altitude of the aircraft, a rate of variation of the altitude of the aircraft, an angle of descent of the aircraft.

The second detection means thus configured makes the detection of a condition for activation of a reverse idle control more reliable because it allows to detect a situation corresponding to a start of flare in the final phase of landing, which is a situation suitable for controlling the activation of the reverse idle control.

Advantageously, a necessary condition for the second detection means to detect a condition for activation of the reverse idle control is that an aircraft engine power control is comprised between 0% and 5% of the maximum power.

This makes the detection of a condition for activation of a reverse idle control more reliable because the aforementioned engine power control range typically corresponds to the engine power control range implemented when an aircraft is in a start of flare situation in final landing phase.

According to another aspect, provision is made of a method for controlling a thrust reversal means connected to at least one engine of an aircraft, comprising, in this order:

the detection of a condition for activation of a reverse idle control,
the activation of the reverse idle control,
the detection of a condition for activation of the thrust reversal means, and
the activation of the thrust reversal means.

Preferably, the detection of a condition for activation of a reverse idle control preferably being the detection of a situation at the start of a flare before landing of the aircraft or the detection of a situation of triggering an aborted take-off.

BRIEF DESCRIPTION OF THE DRAWINGS

Other purposes, features and advantages of the invention will appear upon reading the following description, given only by way of non-limiting example, and made with reference to the indexed drawings on which:

FIG. 2 to which reference has already been made, illustrate an example of a control lever equipping aircraft, FIG. 3 schematically illustrates an aircraft according to one aspect of the present invention, FIG. 4 schematically illustrates a control system according to a first embodiment that can be incorporated into the aircraft of FIG. 3, FIG. 5 schematically illustrates a first example of a control method that can be implemented using the system of FIG. 4, FIG. 6 further schematically illustrates the first example of a control method that can be implemented using the system of FIG. 4, FIG. 7 schematically illustrates a second example of a control method that can be implemented by means of the system of FIG. 4, FIG. 8 further schematically illustrates the second example of a control method that can be implemented by means of the system of FIG. 4, and FIG. 9 schematically illustrates a control system according to a second embodiment.

DETAILED DESCRIPTION

Figure 3:
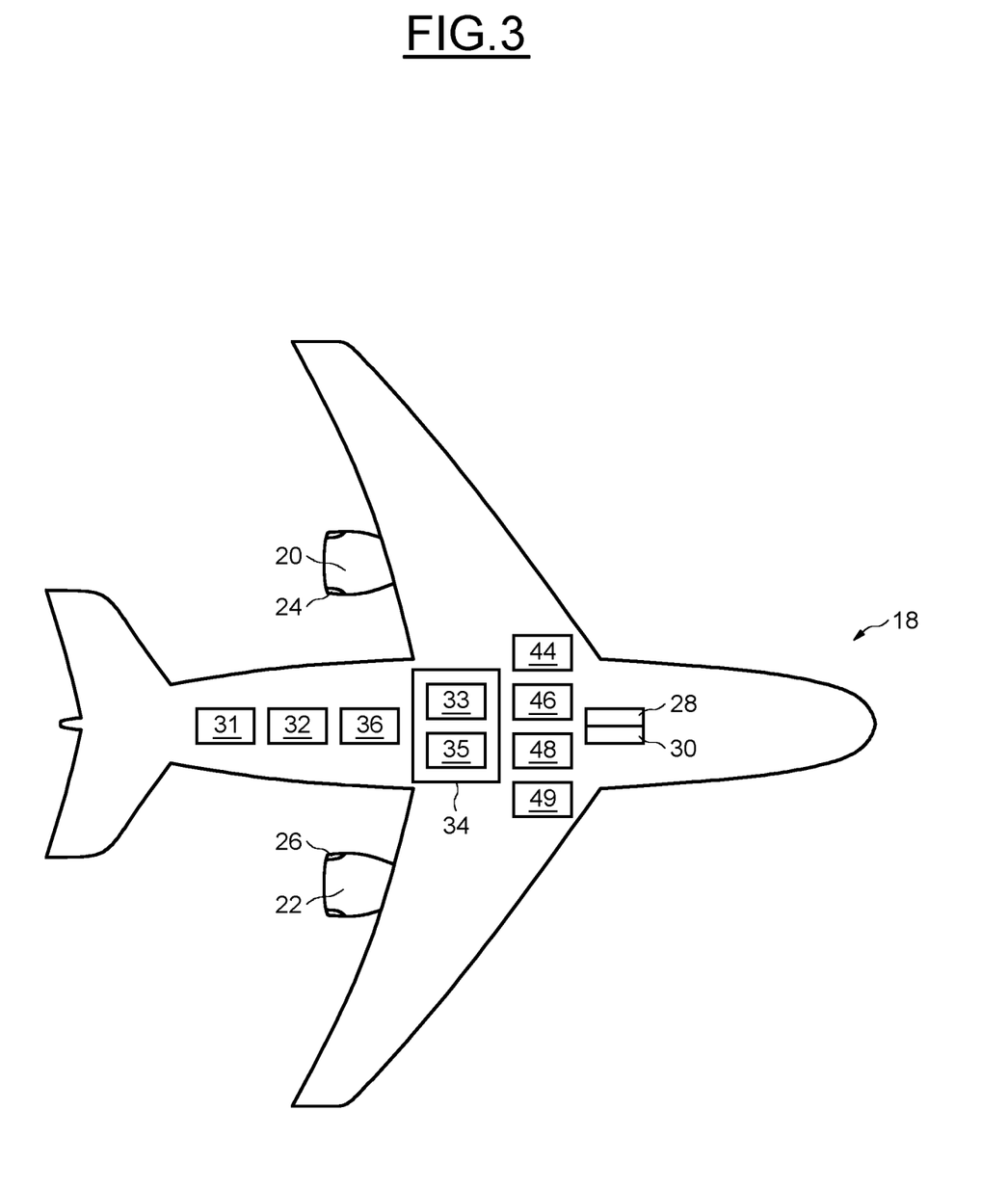

With reference to FIG. 3, an aircraft 18 is schematically shown according to one aspect of the present invention. In this case, the aircraft 18 is an airplane provided with two jet engines 20 and 22.

Each engine 20, 22 is respectively provided with a thrust reverser 24, 26. The thrust reversers 24 and 26, known per se, comprise flaps located downstream of the flow passing through the engines 20 and 22. The flaps of the thrust reversers 24 and 26 deflect the flow of air coming from the engines 20 and 22 so as to exert a thrust directed towards the front of the aircraft 18. A thrust reverser 24, 26 is closed when its flaps do not deflect the flow of air coming from the respective engine 20, 22, and open when its flaps deflect the flow of air coming from the respective engine 20, 22. Alternatively, the thrust reversers 24 and 26 can be cascades capable of uncovering each other.

The aircraft 18 includes two control levers 28 and 30. The control levers 28, 30 can be handled by a pilot (not shown) of the aircraft 18 to control the thrust generated by the respective engines 20, 22. The levers 28 and 30 can be accompanied by graduations similar to the graduations accompanying the levers 2 and 4 shown in FIGS. 1 and 2. In particular, the levers 28 and 30 can be positioned in the forward range 6 between the forward idle position 8 and the forward full throttle position 10, or in the thrust reversal range 12 between the reverse idle position 14 and the maximum power position with reverser 16.

The aircraft 18 includes a speed detector 44, which can for example be a Pitot probe, an altimeter 46, a radio altimeter 48, and a sensor 49 of the position of the levers 28 and 30.

The aircraft 18 includes a weight detector on the wheels 31. The weight detector 31 can be a load or force detector. The function of the detector 31 is to detect a situation wherein the weight of the aircraft 18 rests on the wheels of a landing gear (not shown) of the aircraft 18. This condition is also known by the name "Weight on Wheels" or under the corresponding acronym "WoW".

The aircraft 18 includes a disc brake system 32. The system 32 is capable of implementing friction braking on the wheels of the landing gear of the aircraft 18.

The aircraft 18 includes an auto brake module 34. The auto brake module 34 can be handled by the pilot so as to be armed and to select a braking intensity. In this respect, the module 34 includes an arming button 33 and an input interface 35. When the auto brake module 34 is armed, it is configured to control the system 32 at the braking intensity entered as soon as the detector 31 detects that the weight of the aircraft 18 rests on the wheels of the landing gear. It is possible to consider, without departing from the scope of the invention, a different automatic engagement logic of the system 32, for example a combination of a weight condition of the aircraft 18 resting on the wheels of the landing gear, of a deployed spoiler condition and a confirmation time condition.

The aircraft 18 is provided with a control system 36 of the thrust reversers 24 and 26. The system 36 will now be detailed with reference to FIG. 4.

Figure 4:
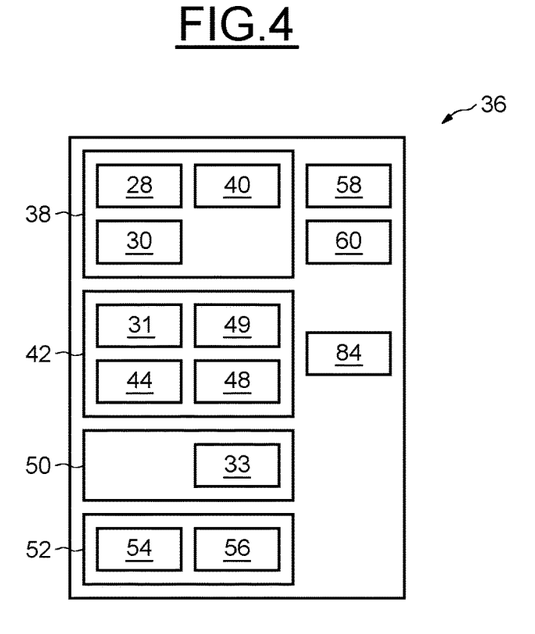

The system 36 includes a control means 38 comprising the levers 28 and 30 and a controller 40.

The system 36 includes a detection module 42. The module 42 comprises the detector 31, the speed detector 44, the radio altimeter 48 and the position sensor 49. Therefore, the detection module 42 is capable of detecting a weight condition of the aircraft 18 resting on the wheels of the landing gear, information on the airspeed of the aircraft 18, information on the altitude of the aircraft 18 relative to the ground and the respective position of the levers 28 and 30.

By calculating the rate of variation of the altitude of the aircraft 18 with respect to time, the detection module 42 can determine the speed of descent of the aircraft 18. By determining the rate of variation of the altitude of the aircraft 18 with respect to the longitudinal displacement of the aircraft 18, the module 42 can determine an angle of descent or climb of the aircraft 18.

The system 36 includes an arming module 50. The arming module 50 includes the arming button 33 of the auto brake system 34.

The system 36 includes an actuation module 52. The module 52 comprises an actuation unit 54 capable of controlling the opening and closing of the thrust reverser 24, and an actuation unit 56 capable of controlling the opening and closing the thrust reverser 26.

The system 36 includes an electric motor 58 capable of modifying the position of the lever 28 and an electric motor 60 capable of modifying the position of the lever 30. The motors 58 and 60 allow to switch the levers 28 and 30 between the reverse idle position 14 and the forward full throttle position 10.

Figure 5:
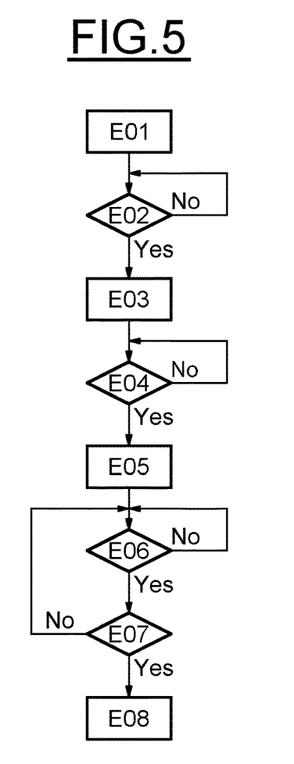
Figure 6:
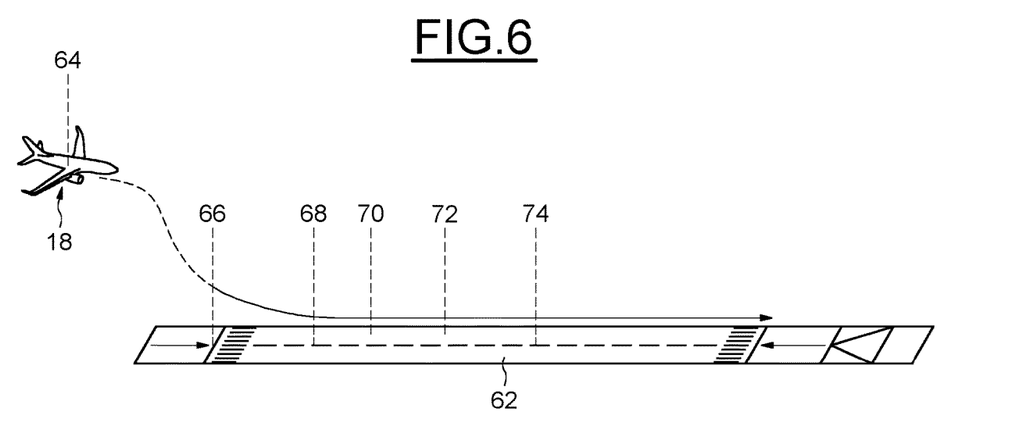

The method for controlling the thrust reversers 24 and 26 represented in FIGS. 5 and 6 can be implemented by means of the control system 36.

The method represented in FIGS. 5 and 6 begins during an approach phase with a view to landing the aircraft 18 on a runway 62. For example, the method begins with a step E01 of checklist of approach. During step E01, the pilot of the aircraft 18 undertakes a plurality of actions intended to prepare the aircraft 18 for approach to and landing on the runway 62. During step E01, the pilot can in particular press the arming button 33 of the auto brake module 34. The situation of the aircraft 18 with respect to the runway 62 during the step E01 is schematically shown in FIG. 6 by the reference 64.

The method of FIG. 5 includes a second test step E02. During step E02, it is determined whether the pilot has pressed the arming button 33. If the answer to step E02 is "no", it is considered that the pilot has not armed the arming module 50 of the auto-brake system 36, and the thrust reversers 24 and 26 will not be controlled automatically by the system 36.

If, at the end of step E02, the answer is "yes", a step E03 of activation of the arming module 50 is applied.

Following step E03, a test step E04 for detecting a condition for activation of the reverse idle control is applied. During step E04, the detection module 42 collects the speed detected by the detector 44, the altitude emitted by the radio altimeter 48, the position of the levers 28 and 30 as well as the angle of descent of the aircraft 18. From these data, the detection module 42 determines during step E04 whether the aircraft 18 begins the flare before touchdown on the runway 62. As long as the data collected by the module 42 does not indicate that the aircraft 18 has started the flare with a view to touchdown on the runway 62, the answer to the test step E04 is "no".

As soon as the module 42 determines that the aircraft 18 is beginning the flare with a view to touchdown on the runway 62, the condition for activating the reverse idle control is detected and the answer to the test step E04 is "yes". The instant at which the answer to the test step E04 becomes "yes" is schematically represented in FIG. 6 by the reference 66.

For example, the condition for activation of the reverse idle control can be detected when the altitude above the ground is less than 50 feet, the airspeed is within a tolerance of 5% around the reference speed for the landing, the position of the levers 28 and 30 is in the forward range 6 and comprised between 0% and 5% of the maximum power that can be supplied by the engines 20 and 22, and the vertical speed is negative. Alternatively, the position of the levers 28 and 30 can be comprised between −5% and +5% around the forward idle position 8.

During the following step E05, the controller 40 controls the electric motors 58 and 60 so as to switch the levers 28 and 30 into the reverse idle position 14. Consequently, the reverse idle control is active without the thrust reversers 24 and 26 being open because the weight of the aircraft 18 does not yet rest on the wheels of the landing gear.

The method includes a test step E06 during which it is determined whether the weight of the aircraft 18 rests on the wheels of the landing gear. As long as the weight of the aircraft 18 does not rest on the wheels of the landing gear, the answer to step E06 is "no". After the aircraft 18 has touched down on the runway 62, the detection module 42 detects that the weight of the aircraft 18 rests on the wheels of the landing gear and the answer to step E06 is "yes". The instant at which the answer to step E06 becomes "yes" is schematically represented in FIG. 6 by the reference 68.

When the answer to state E06 is "yes", a test step E07 for detecting a condition for activation of the thrust reversers 24 and 26 is applied. During step E07, it is detected whether the touchdown of the aircraft 18 on the runway 62 is confirmed. For this purpose, it is detected whether the situation wherein the weight of the aircraft 18 rests on the wheels of the landing gear remains true for a certain duration, for example half a second. If, during the half second following the instant 68, the weight of the aircraft 18 no longer rests on the wheels of the landing gear, the answer to step E07 is "no" and the step E06 is applied again. If, for the entire half second following the instant 68, the weight of the aircraft 18 has remained on the wheels of the landing gear, the answer to step E07 is "yes" and a condition for activating the thrust reversers 24 and 26 is activated. The instant at which the response to step E07 becomes "yes" is referenced in FIG. 6 by the reference 70.

A step E08 of deployment of the thrust reversers 24 and 26 in the open position is then applied. During step E08, the units 54 and 56 switch the flaps of the thrust reversers 24 and 26 to the open position, the engines 20 and 22 still operating at idle. The instant at which the thrust reversers 24 and 26 are deployed in the open position is referenced in FIG. 6 by the reference 72, and is approximately 2 seconds after the instant 70.

The method for controlling the thrust reversers 24 and 26 is then complete. At the end of this method, the pilot of the aircraft 18 can pull the levers 28 and 30 towards him to increase the power supplied by the engines 20 and 22, and thus increase the braking effect supplied by the thrust reversers 24 and 26.

The system 36 therefore allows to have the thrust reversers 24 and 26 deployed in the open position 2.5 seconds after the aircraft 18 has touched down on the runway 62. By comparison, when a pilot manually triggers the thrust reversal following touchdown on the track, this duration averages 3.5 seconds. Given that the aircraft 18 is travelling at a very high speed between instants 68 and 72, the system 36 considerably reduces the braking distance of the aircraft 18.

This advantage is even greater when the pilot manually actuates the deployment of the thrust reversers late due to significant stress, which is likely to happen frequently given the fact that the thrust reversers must be used in stressful situations for the pilot, in particular in bad weather conditions or following an excessively long flare. In such examples, the pilot can take several seconds to position the levers 28 and 30 in the reverse idle control position 14. Under these conditions, the duration between instant 68 and instant 72 is much greater than 2.5 seconds. The pilot can even, under the effect of stress, forget to activate the reverse thrust. The braking distance of the aircraft 18 is increased accordingly.

Figure 7:
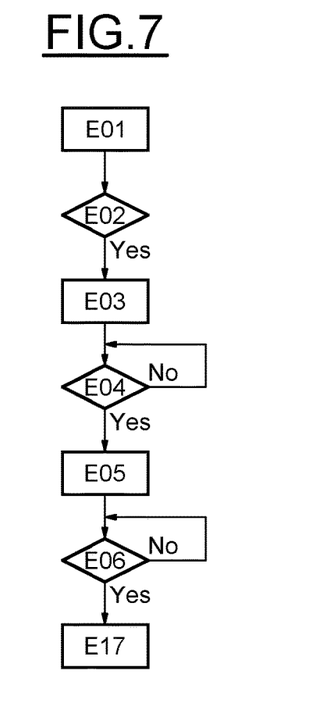
Figure 8:
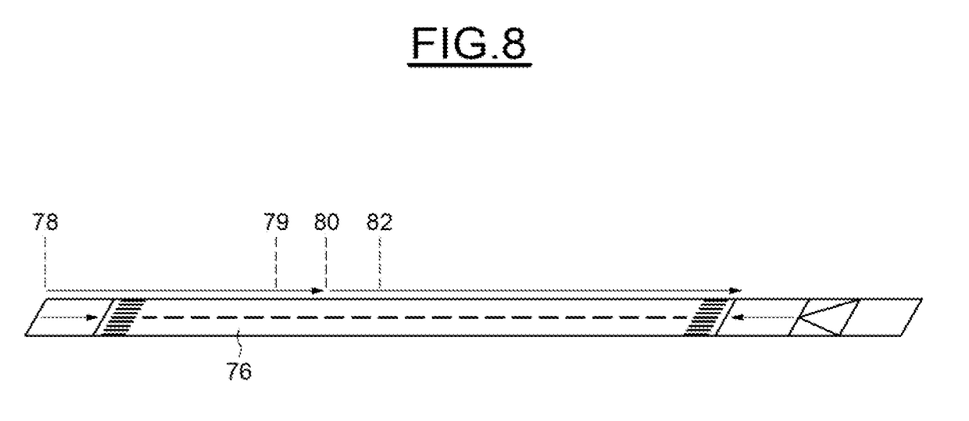

Another example of implementation of a method for controlling the thrust reversers 24 and 26 intended to be implemented by means of the system 36 is schematically shown with reference to FIGS. 7 and 8. The method of FIGS. 7 and 8 begins during a step E01 of preparation for take-off of the aircraft 18 on a take-off runway 76. More particularly, the step E01 can comprise the implementation of a take-off checklist by the pilot of the aircraft 18. During step E01, the pilot prepares the aircraft 18 for take-off on the runway 76. During step 01, the pilot of the aircraft 18 can press the arming button 33 of the auto brake module 34, so that the disc brake system 32 starts automatically in case of detection of an aborted take-off. The instant corresponding to step E01 is schematically represented in FIG. 8 by the reference 78.

The method of FIG. 7 comprises a test step E02 during which it is determined whether the pilot has pressed the arming button 33. If the answer to step E02 is "no", the method of FIG. 7 is terminated and the thrust reversers 24 and 26 will not be controlled automatically by the system 36.

If the answer to the test step E02 is "yes", a step E03 for activating the arming module 50 is applied.

Following step E03, a test step E04 for detecting a condition for activation of the reverse idle control is applied. During step E04, the module 42 detects whether a situation of triggering an aborted take-off is implemented. To this end, the module 42 can collect at least one datum selected from an actuation setpoint for the disc brake system 32, a switching of the levers 28 and 30 from the forward full throttle position 10 to the forward idle position 8, an airspeed of the aircraft 18 lower than the calculated pre-take-off speed V1. As long as, during step E04, a situation of triggering an aborted take-off is not detected, the answer to step E04 is "no". If, during step E04, a situation of triggering an aborted take-off is detected, the response to step E04 is "yes" and a step E05 is applied. The instant at which the event triggering the aborted take-off occurs is represented in FIG. 8 by the reference 79. The instant at which the answer to step E04 becomes "yes" is represented in FIG. 8 by the reference 80.

During step E05, the controller 40 activates the reverse idle control.

The method then comprises a test step E06 for detecting a condition for activation of the thrust reversal means. During step E06, it is detected whether the weight of the aircraft 18 rests on the wheels of the landing gear. As the aircraft 18 has not taken off at the instant 80, the aircraft 18 is on the runway 80 and the answer to step E06 is immediately "yes".

A step E17 is then applied during which the controller 40 controls the electric motors 58 and 60 so as to switch the levers 28 and 30 to the position 14. As a result, the units 54 and 56 deploy the thrust reversers 24 and 26 in the open position.

At the end of step E17, the thrust reversers 24 and 26 are deployed in the open position. The instant corresponding to the end of the deployment of the thrust reversers in the open position is schematically represented in FIG. 8 by the reference 82.

The method is then complete and the pilot can pull the levers 28 and 30 towards him to increase the braking effect by reverse thrust.

As in the method of FIGS. 5 and 6, the system 36 allows to reduce the time elapsed between the instant 79 at the origin of the interruption of the take-off and the instant 82 at which the thrust reversers 24 and 26 are deployed in the open position. In the event of an aborted take-off, the aircraft 18 is liable to circulate at a very high speed and the pilot is liable to be subjected to significant stress. Thus, as in the case of FIGS. 5 and 6, the method of FIGS. 7 and 8 allows to considerably limit the braking distance of the aircraft 18, and therefore to limit accordingly the risk of the longitudinal runway excursion of the aircraft 18.

Thanks to the electric motors 58 and 60 changing the position of the levers 28 and 30, the pilot can monitor the activation of the reverse idle control. If he wishes, he can at any time switch the levers 28 and 30 outside the thrust reversal range 12 so as to leave or restore the thrust reversers 24 and 26 in the closed position.

With reference to FIG. 4, the system 36 may further comprise a display means 84. In this case, the display means 84 comprises a display screen (not shown) capable of displaying a message "reverse idle control active". When provided, the display means 84 thus provides an additional means of informing the pilot of the aircraft 18 of the activation of the reverse idle control.

Figure 9:
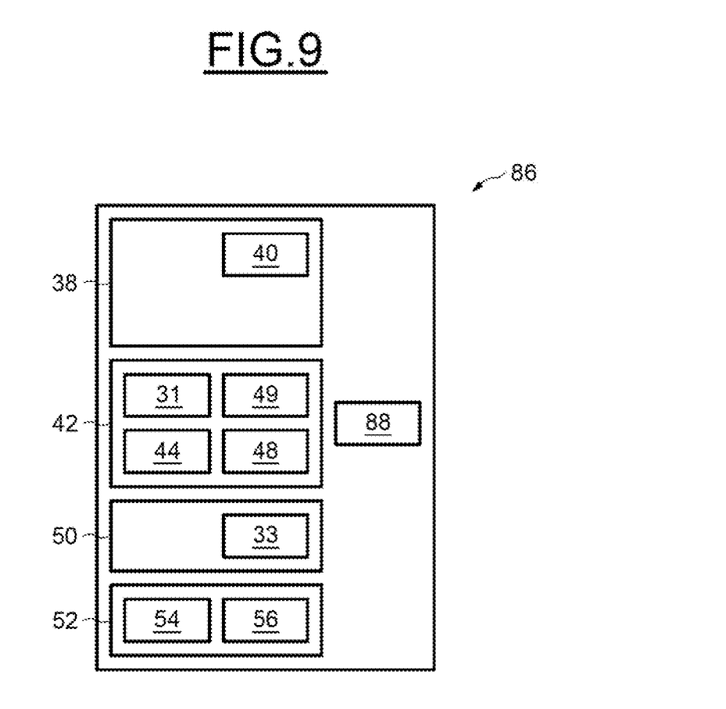

A control system 86 according to a second embodiment of the invention is shown with reference to FIG. 9. The system 86 can be incorporated into the aircraft 18 instead of the system 36. Identical elements bear the same references.

The system 86 differs from the system 36 in that the control means 38 does not have levers 28 and 30. The system 86 further differs from the system 36 in that it does not have electric motors 58 and 60. Moreover, the controller 40 is in direct communication of information with the units 54 and 56. The system 86 includes the display means 84.

When the system 86 is used to implement the method of FIGS. 5 and 6, during step E05, the controller sends a message to the display means 84 to display the message "reverse idle control active". The controller 40 may, alternatively, emit an audio message. The controller 40 may also emit a combination of the text message and the audio message. At the end of step E05, the pilot is therefore informed of the active state of the reverse idle control. Furthermore, during step E08, the controller 40 generates an instruction for deploying the thrust reversers 24 and 26 in the open position and sends this instruction to the units 54 and 56. As a result, the thrust reversers 54 and 56 are deployed in the open position without the levers 28 and 30 being switched.

When the system 86 is used to implement the method of FIGS. 7 and 8, during step E05, the controller sends the signal to the display means 84 to display the message "reverse idle control active" and sends the instruction to deploy thrust reversers 24 and 26 in the open position to the units 54 and 56.

Like the system 36, the system 86 can be used to implement the methods shown in FIGS. 5, 6, 7, and 8. However, while in the case of the system 36, the controller 40 indirectly controls the units 54 and 56 by controlling the motors 58 and 60 to change the position of the levers 28 and 30, in the case of the system 86, controller 40 acts directly on the units 54 and 56.

The invention claimed is:

1. A system for controlling an aircraft thrust reverser, comprising a reverse idle control, a first detection means configured to detect, when the reverse idle control is active, a condition for activation of the thrust reverser, an actuation means configured to activate the thrust reverser when the first detection means detects a condition for activation of the thrust reverser, and a second detection means configured to detect a condition for activation of the reverse idle control, the reverse idle control being configured to activate when the second detection means detects a condition for activating the reverse idle control.

2. The system according to claim 1, wherein the second detection means is capable of detecting at least one parameter selected from a speed of the aircraft, an altitude of the aircraft, a rate of variation of the altitude of the aircraft, and an angle of descent of the aircraft.

3. The system according to claim 1, wherein a necessary condition for the second detection means to detect a condition for activation of the reverse idle control is that an aircraft engine power control is comprised between 0% and 5% of the maximum power.

4. The system according to claim 1, further comprising an arming module able to be activated by a user during a step of preparing the landing of the aircraft and/or a step of preparing the take-off of the aircraft, the second detection means being configured to detect a condition for activation of the reverse idle control only if the arming module is activated.

5. The system according to claim 4, wherein the arming module comprises means for arming an auto brake system of the aircraft, the arming module being configured to be activated when a user actuates the arming means.

6. The system according to claim 1, wherein the control means comprises a controller and a control lever for at least one engine of the aircraft, the control lever being capable of activating a reverse idle control.

7. The system according to claim 6, comprising a motorised actuator in communication of information with the controller, the controller being able to control the motorised actuator so as to change a position of the control lever between a position wherein the control lever controls a forward operation of the engine of the aircraft and a position wherein the control lever activates a reverse idle control.

8. The system according to claim 6, further comprising means for displaying the position of the control lever.

9. The system according to claim 6, comprising means for displaying the activation of the reverse idle control, the controller being capable of directly activating the reverse idle control.

10. A method for controlling a thrust reverser system connected to at least one engine of an aircraft, wherein the thrust reverser system comprises a detector, a speed detector, a radio altimeter, a position sensor, and levers comprising:
  detecting a condition for activation of a reverse idle control by:
    collecting speed detected by the speed detector,
    collecting an altitude emitted by the radio altimeter,
    determining a position of the levers, and
    determining the angle of descent or climb of the aircraft,
  activating the reverse idle control,
  detecting a condition for activation of the thrust reverser by:
    determining if the weight of the aircraft rests on wheels of landing gear; and
    when the weight of the aircraft rests on the wheels of the landing gear, activating the thrust reverser, and
  detecting a condition for activation of the reverse idle control.

11. The method of claim 10, wherein the condition for activation of the reverse idle control is a detection of a situation at a start of a flare before landing the aircraft.

12. The method of claim 10, wherein the condition for activation of the reverse idle control is a detection of a situation of triggering an aborted take-off.

13. The method of claim 10, further comprising:
  activating an arming module when preparing the landing of the aircraft; and
  detecting a condition for activation of the reverse idle control.

14. The method of claim 10, further comprising:
  displaying the activation of the reverse idle control.

15. The method of claim 10, further comprising:
  pulling the levers to increase power supplied by the one of more engines; and
  increasing a braking effect supplied by the thrust reversers.

16. The method of claim 10, wherein the condition for activation of the thrust reverser is selected from the altitude above ground being less than 50 feet, the airspeed being within a tolerance of 5% around a reference speed for the landing, the position of the levers being in a forward range and between 0% and 5% of the maximum power that can be supplied by the at least one engine wherein a vertical speed is negative, or the position of the levers being between −5% and +5% around a forward idle position.

17. The method of claim 16, further comprising:
displaying the position of the reverse idle control.

* * * * *

UNITED STATES PATENT AND TRADEMARK OFFICE
CERTIFICATE OF CORRECTION

Page 1 of 1

PATENT NO. : 12,065,986 B2
APPLICATION NO. : 17/790048
DATED : August 20, 2024
INVENTOR(S) : L. Miralles et al.

It is certified that error appears in the above-identified patent and that said Letters Patent is hereby corrected as shown below:

On the Title Page

| Column | Line | |
| --- | --- | --- |
| Item (71) Applicants | 2 | change "l'Orcher" to -- L'Orcher -- |
| Item (73) Assignees | 2 | change "l'Orcher" to -- L'Orcher -- |
| Item (73) Assignees | 4 | change "Villacou-Blay" to -- Villacoublay -- |

Signed and Sealed this
Eighteenth Day of November, 2025

John A. Squires
*Director of the United States Patent and Trademark Office*